(12) United States Patent
Jenko et al.

(10) Patent No.: US 8,540,507 B2
(45) Date of Patent: Sep. 24, 2013

(54) MOLD TOOL SYSTEM HAVING MANIFOLD BODY INCLUDING UNINTERRUPTED MELT CHANNELS

(75) Inventors: Edward Joseph Jenko, Essex, VT (US); Patrice Fabien Dezon-Gaillard, Jericho, VT (US); Abdeslam Bouti, St. Albans, VT (US); James Osborne Plumpton, Ensoburg Falls, VT (US)

(73) Assignee: Husky Injection Molding Systems, Ltd., Bolton, Ontario (CA)

( * ) Notice: Subject to any disclaimer, the term of this patent is extended or adjusted under 35 U.S.C. 154(b) by 31 days.

(21) Appl. No.: 13/358,532

(22) Filed: Jan. 26, 2012

(65) Prior Publication Data

US 2012/0141626 A1    Jun. 7, 2012

Related U.S. Application Data

(63) Continuation-in-part of application No. 12/953,611, filed on Nov. 24, 2010, now Pat. No. 8,206,146.

(60) Provisional application No. 61/392,506, filed on Oct. 13, 2010, provisional application No. 61/267,581, filed on Dec. 8, 2009.

(51) Int. Cl.
   *B29C 45/22* (2006.01)

(52) U.S. Cl.
   USPC ........................................ 425/572; 425/588

(58) Field of Classification Search
   USPC .......................................... 425/130, 572, 588
   See application file for complete search history.

(56) References Cited

U.S. PATENT DOCUMENTS

| | | | |
|---|---|---|---|
| 4,657,496 A * | 4/1987 | Ozeki et al. | 425/130 |
| 4,965,028 A | 10/1990 | Mans et al. | |
| 5,536,164 A | 7/1996 | Brun, Jr. et al. | |
| 5,683,731 A | 11/1997 | Deardurff et al. | |
| 5,738,149 A | 4/1998 | Brun, Jr. et al. | |
| 6,149,423 A | 11/2000 | Manz | |
| 2009/0236774 A1 | 9/2009 | Blais et al. | |
| 2009/0274790 A1 | 11/2009 | Jenko et al. | |
| 2010/0310694 A1 | 12/2010 | Niewels et al. | |

OTHER PUBLICATIONS

Mold-Masters pamphlet entitled "Your Connection! . . . To Injection Molding Excellence: Modular Manifolds & Master-Probe Nozzle Probes", Apr. 1986, pp. 1-40.*

* cited by examiner

*Primary Examiner* — Tim Heitbrink (57) ABSTRACT

A mold-tool system is provided which includes a manifold body including an inlet assembly, a plurality of outlets spaced from the inlet assembly, and an uninterrupted melt channel associated with each outlet and extending between the inlet assembly and its associated outlets. Each melt channel may have a length which is substantially identical to the length of the other melt channels.

8 Claims, 8 Drawing Sheets

MOLD TOOL SYSTEM HAVING MANIFOLD BODY INCLUDING UNINTERRUPTED MELT CHANNELS

CROSS-REFERENCE TO RELATED PATENT APPLICATION(S)

This application is a continuation-in-part of co-pending U.S. application Ser. No. 12/953,611 entitled "MOLD-TOOL SYSTEM HAVING MANIFOLD BODY DEFINING UNINTERRUPTED MELT CHANNELS" filed Nov. 24, 2010, which is herein incorporated by reference in its entirety, which claims the benefit of U.S. Provisional Application Ser. No. 61/392,506 filed on Oct. 13, 2010 and U.S. Provisional Application Ser. No. 61/267,581 filed on Dec. 8, 2009, both of which are herein incorporated by reference in their entirety.

TECHNICAL FIELD

An aspect generally relates to (but is not limited to) a mold-tools system having a manifold body having uninterrupted melt channels.

BACKGROUND

The first man-made plastic was invented in Britain in 1851 by Alexander Parkes. He publicly demonstrated it at the 1862 International Exhibition in London, calling the material Parkesine. Derived from cellulose, Parkesine could be heated, molded, and retain its shape when cooled. It was, however, expensive to produce, prone to cracking, and highly flammable. In 1868, American inventor John Wesley Hyatt developed a plastic material he named Celluloid, improving on Parkes' concept so that it could be processed into finished form. Hyatt patented the first injection molding machine in 1872. It worked like a large hypodermic needle, using a plunger to inject plastic through a heated cylinder into a mold. The industry expanded rapidly in the 1940s because World War II created a huge demand for inexpensive, mass-produced products. In 1946, American inventor James Watson Hendry built the first screw injection machine. This machine also allowed material to be mixed before injection, so that colored or recycled plastic could be added to virgin material and mixed thoroughly before being injected. In the 1970s, Hendry went on to develop the first gas-assisted injection molding process.

Injection molding machines consist of a material hopper, an injection ram or screw-type plunger, and a heating unit. They are also known as presses, they hold the molds in which the components are shaped. Presses are rated by tonnage, which expresses the amount of clamping force that the machine can exert. This force keeps the mold closed during the injection process. Tonnage can vary from less than five tons to 6000 tons, with the higher figures used in comparatively few manufacturing operations. The amount of total clamp force is determined by the projected area of the part being molded. This projected area is multiplied by a clamp force of from two to eight tons for each square inch of the projected areas. As a rule of thumb, four or five tons per square inch can be used for most products. If the plastic material is very stiff, more injection pressure may be needed to fill the mold, thus more clamp tonnage to hold the mold closed. The required force can also be determined by the material used and the size of the part, larger parts require higher clamping force. With Injection Molding, granular plastic is fed by gravity from a hopper into a heated barrel. As the granules are slowly moved forward by a screw-type plunger, the plastic is forced into a heated chamber, where it is melted. As the plunger advances, the melted plastic is forced through a nozzle that rests against the mold, allowing it to enter the mold cavity through a gate and runner system. The mold remains cold so the plastic solidifies almost as soon as the mold is filled. Mold assembly or die are terms used to describe the tooling used to produce plastic parts in molding. The mold assembly is used in mass production where thousands of parts are produced. Molds are typically constructed from hardened steel, etc. Hot-runner systems are used in molding systems, along with mold assemblies, for the manufacture of plastic articles. Usually, hot-runners systems and mold assemblies are treated as tools that may be sold and supplied separately from molding systems.

U.S. Pat. No. 5,536,164 discloses a manifold assembly for supplying plastic material from a plastic source to a mold assembly in an injection molding machine and includes a flexible manifold having an interior conduit connected between the plastic source and the mold assembly. The flexible manifold is configured to define an input connector, a first curved segment attached to the input connector, a second curved segment, an output connector attaching the second curved segment to the mold assembly, and an intermediary segment connecting the first and second curved segments. This provides the flexible manifold with a generally S-shaped configuration that flexes with temperature changes to maintain a substantially constant positioning between the input connector and the output connector, preventing thermally induced movement of the mold assembly with respect to the input connector as heated plastic is injected through the conduit.

U.S. Pat. No. 5,738,149 discloses a manifold assembly for supplying plastic material from a plastic source to a mold assembly in an injection molding machine and includes a flexible manifold having an interior conduit connected between the plastic source and the mold assembly. The flexible manifold is configured to define an input connector, a first curved segment attached to the input connector, a second curved segment, an output connector attaching the second curved segment to the mold assembly, and an intermediary segment connecting the first and second curved segments. This provides the flexible manifold with a generally S-shaped configuration that flexes with temperature changes to maintain a substantially constant positioning between the input connector and the output connector, preventing thermally induced movement of the mold assembly with respect to the input connector as heated plastic is injected through the conduit.

U.S. Pat. No. 6,149,423 discloses a hot channel die that is arranged within a casing filled with oil. In the hollow space filled with oil, baffles are installed which effect a current of the oil directed toward the two ends of the die. For this purpose, the heating element is arranged on the underside of the casing. The discharge sleeve, which introduces the liquid plastic from the feeding screw, discharges into the hollow body, which is mounted in a recess in the hot runner plate of a hot channel injection molding die. The distribution conduits, which are constructed as curved tubes, are installed on the discharge sleeve, and lead to the side wall, against which the rear ends of the injection nozzles lie. The hollow space is filled with a heat-conducting medium, for example oil, which is heated by a heater and uniformly circulated within the hollow space by convection or motorized circulation. Baffles optimize the circulation of the medium and its return guidance to the heater.

U.S. Pat. No. 5,683,731 discloses a redistributing device for use with melt flow exhibiting boundary layer flow and centralized flow and comprises a body including a melt flow inlet end and a plurality of melt flow outlets. A first flow diverter is included for distributing at least the boundary layer flow among the plurality of the melt flow outlets. A second flow diverter is included for distributing at least the centralized flow among the plurality of melt flow outlets.

U.S. Pat. No. 4,965,028 discloses a method and apparatus for thermoplastic multigated single cavity or multicavity injection molding. A plasticized melt flows along a melt distributing passageway, and enters through a plurality of gates associated with one or more mold cavity. Melt temperature is maintained by means of manifold heaters, bushing heater band and, most preferably, heated probe. A unique melt conditioning element placed just upstream of gate forces the melt to enter a plurality of inlet melt channels and flow through a region of constricted cross section and/or angular change of flow direction formed by the geometric relationship of a bushing wall to said element. The result is to provide, by design, various degrees of melt heating, melt filtration, and melt homogenization.

SUMMARY

The inventors have researched a problem associated with known molding systems that inadvertently manufacture bad-quality molded articles or parts. After much study, the inventors believe they have arrived at an understanding of the problem and its solution, which are stated below, and the inventors believe this understanding is not known to the public.

Known melt channel layouts used in known hot runner systems create a mass imbalance. Every hot runner with multiple drops tries to divide the melt such that each drop gets an equal amount of resin. The problem is believed to be that almost all intersections are designed to perfectly geometrically divide the melt flow, but are dividing a non-homogeneous melt flow front. In addition, as each melt channel splits the melt, the melt flow front becomes more and more non-homogeneous. Therefore the more splits there are, the more the melt flow becomes unbalanced in the hot runner. Melt channel intersections or splits are typically the highest stress areas known in the manifold. In more challenging applications, there will be a requirement for higher injection pressures. Therefore the manifold material strength must be increased to support these larger stresses. Higher strength materials cost more money, thus increasing the manufacturing cost of a hot runner.

According to one aspect, a mold-tool system is provided which includes a manifold body. The manifold body includes an inlet assembly, a plurality of outlets spaced from the inlet assembly, and an uninterrupted melt channel associated with each outlet and extending between the inlet assembly and its associated outlet.

According to another aspect, a method of providing melt to outlets in a manifold of a mold tool system is provided. The method includes providing a melt to a melt distribution assembly which includes a manifold, providing the melt to a plurality of inlets, and passing the melt from each inlet to a dedicated outlet along an uninterrupted, dedicated melt channel that has no melt channel splits or breaks.

According to yet another aspect, a mold-tool system is provided which includes a manifold body. The manifold body includes a plurality of inlets, a plurality of outlets spaced from the plurality of inlets, and a plurality of uninterrupted melt channels extending between the plurality of inlets and the plurality of outlets. Each of the uninterrupted melt channels is associated with only one inlet and only one outlet. The plurality of melt channels includes at least a first melt channel having a first length, and a second melt channel having a second length, where the first length is substantially identical to the second length.

Other aspects and features of the non-limiting embodiments will now become apparent to those skilled in the art upon review of the following detailed description of the non-limiting embodiments with the accompanying drawings.

DETAILED DESCRIPTION OF THE DRAWINGS

The non-limiting embodiments will be more fully appreciated by reference to the following detailed description when taken in conjunction with the accompanying drawings, in which.

The drawings are not necessarily to scale and may be illustrated by phantom lines, diagrammatic representations and fragmentary views. In certain instances, details not necessary for an understanding of the embodiments (and/or details that render other details difficult to perceive) may have been omitted.

DETAILED DESCRIPTION OF THE NON-LIMITING EMBODIMENT(S)

Figure 1A:
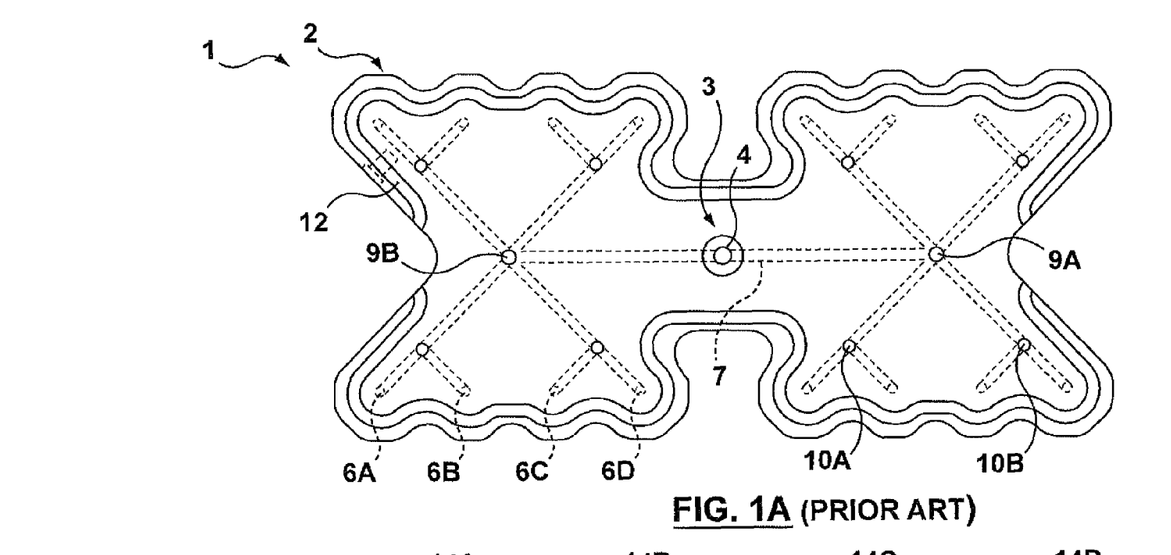
FIG. 1A is a schematic representation of a known mold-tool system.

FIG. 1A is a schematic representation of a known mold-tool system (1). The mold-tool system (1) includes a melt-distribution assembly (2), which includes a manifold body. The manifold body is of the type known as a gun drilled manifold body. An inlet assembly (3) includes an inlet (4) defined by the manifold body of the manifold assembly. The manifold body also includes outlets (6A, 6B, 6C, 6D). A melt channel (7) is included in the manifold body. The melt channel (7) extends from the inlet (4) along two separate directions toward splits (9A, 9B). The melt channel (7) splits at each split (9A, 9B) into four separate directions. For example, the melt channel (7) divides from the split (9A) into four directions in which two of the directions meet up with additional splits (10A, 10B). A split is an interruption or an intersection in the melt channel (7). The melt channel (7) further divides out from the splits toward four outlets (depicted but not identified). A heater (12) is attached to the manifold assembly.

Figure 1B:
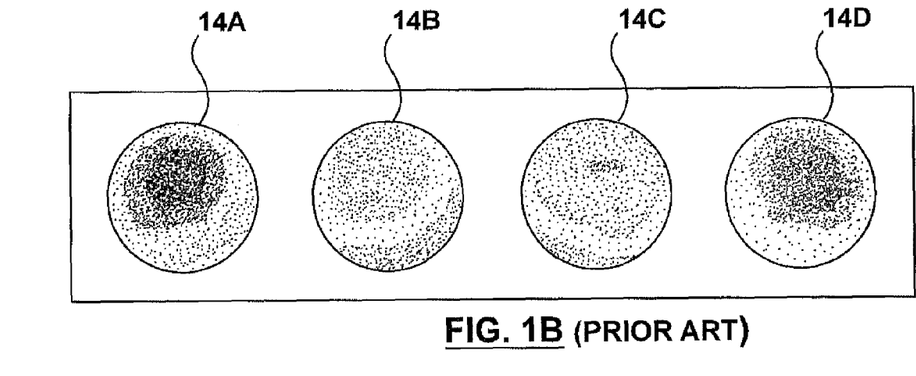
FIG. 1B is a schematic representation of thermal profiles of the outputs of the known mold-tool system shown in FIG. 1A.

FIG. 1B is a schematic representation of the thermal profiles (14A, 14B, 14C, 14D) for the outputs (6A, 6B, 6C, 6D) of the known mold-tool system (1) shown in FIG. 1A. In FIG. 1B, the darkened regions indicate areas where the temperature of the melt is higher, whereas the lighter regions indicate areas where the temperature of the melt is lower. As illustrated, the different outlets (6A, 6B, 6C, 6D) of the manifold body depicted in FIG. 1A each have different temperature profiles, and some of the outlets are hotter than other outlets. It will be appreciated that a colder outlet may result in a light weight molded part, whereas hotter outlets may result in relatively heavier molded parts, because more of the melt may enter into the mold cavity of a mold assembly that fluidly communicates with the outlet. This is known as unbalanced filling of the mold assembly, and the inventors believe that this is a result of the splits (9A, 9B, 10A, 10B); that is, splitting and re-splitting of the melt flowing along the melt channel (7). It is also believed that the splits may create dead zones, which are low flow or no flow portions of the melt in the melt channel (7), which may result in degradation or color changes, etc., as a result of a melt that hangs and fails to move quickly enough through the melt channel (7).

Figure 2A:
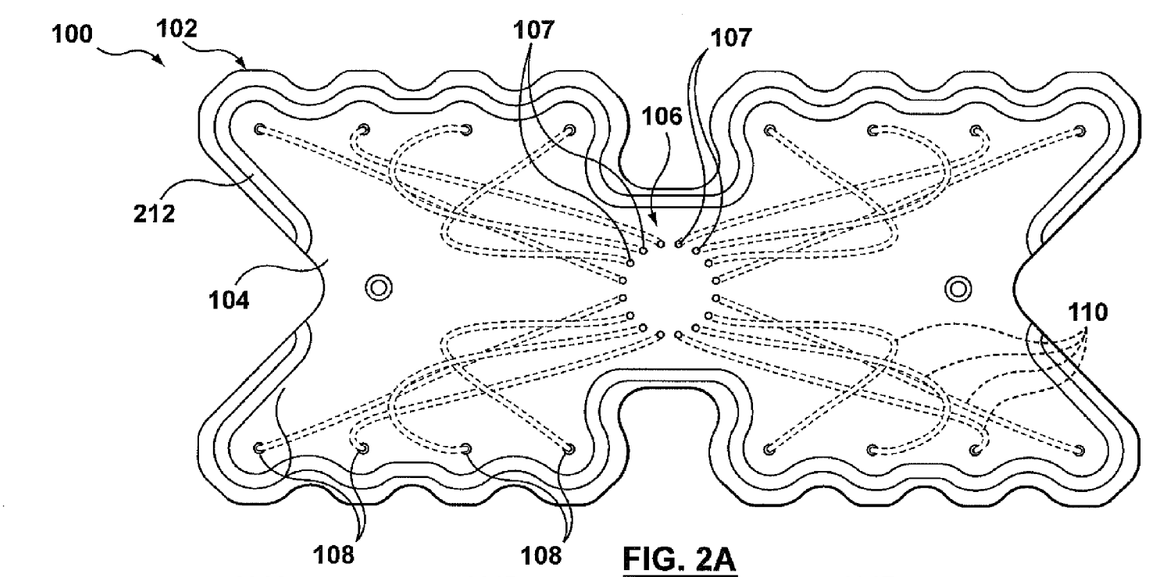
FIG. 2A is a schematic representation of one embodiment of a mold-tool system.
Figure 2B:
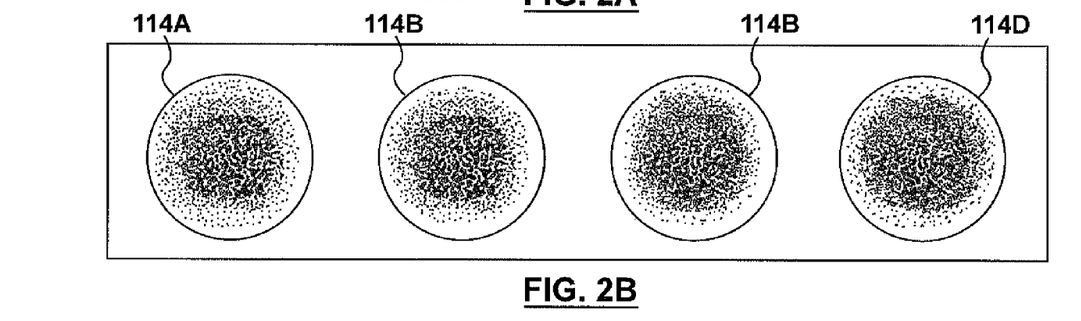
FIG. 2B is a schematic representation of thermal profiles of the outputs of the mold-tool system shown in FIG. 2A.
Figure 2C:
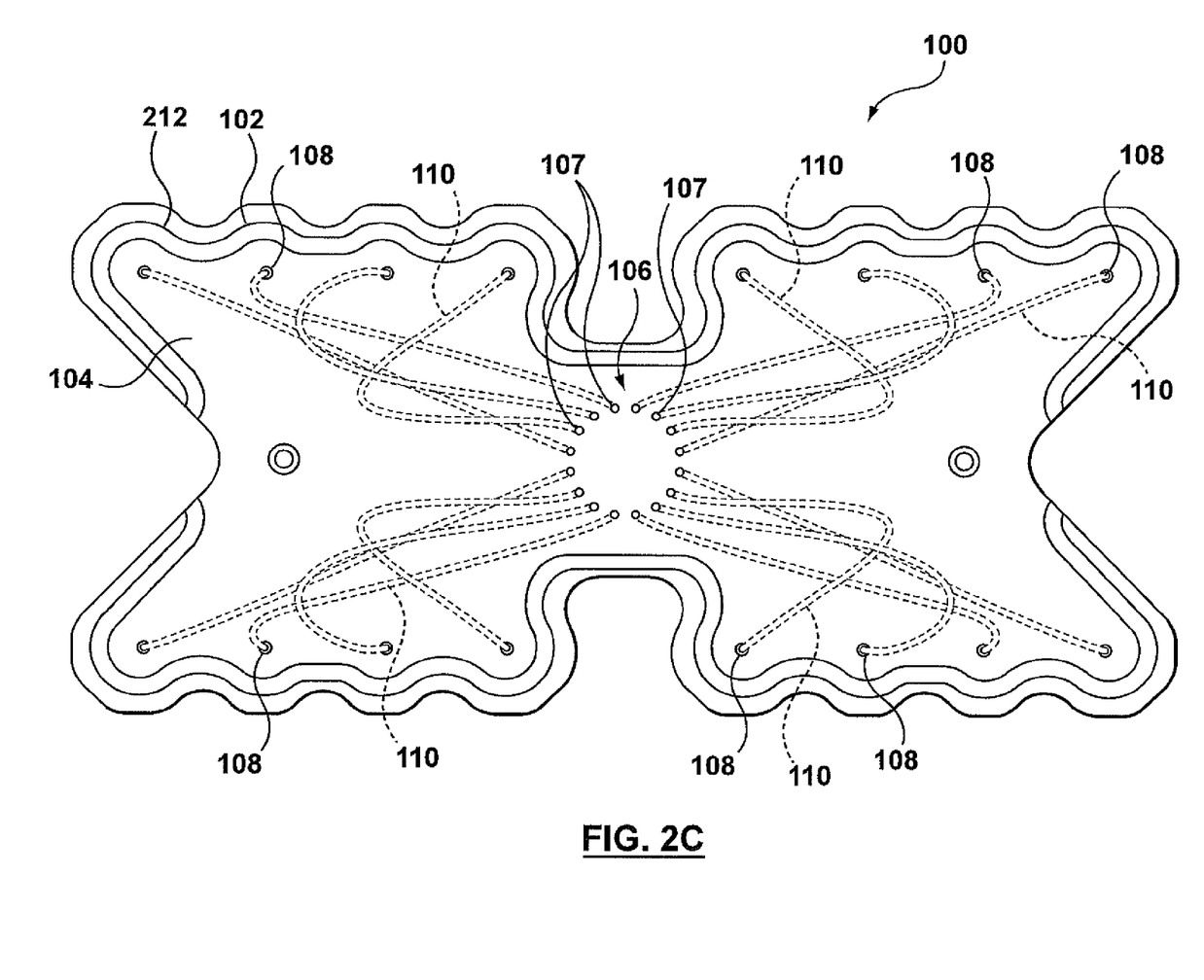
FIG. 2C is a close up view of the mold-tool system shown in FIG. 2A.

FIG. 2A and 2C are schematic representations of one embodiment of the mold-tool system (100). The mold-tool system (100) may include components that are known to persons skilled in the art, and these known components will not be described here; these known components are described, at least in part, in the following reference books (for example): (i) "Injection Molding Handbook" authored by OSSWALD/TURNG/GRAMANN (ISBN: 3-446-21669-2), (ii) "Injection Molding Handbook" authored by ROSATO AND ROSATO (ISBN: 0-412-99381-3), (iii) "Injection Molding Systems" 3.sup.rd Edition authored by JOHANNABER (ISBN 3-446-17733-7) and/or (iv) "Runner and Gating Design Handbook" authored by BEAUMONT (ISBN 1-446-22672-9). It will be appreciated that for the purposes of this document, the phrase "includes (but is not limited to)" is equivalent to the word "comprising".

The mold-tool system (100) may be implemented as a hot runner system or it may be implemented as a cold runner system. The mold-tool system (100) is a system that is supported by a platen assembly (known but not depicted) of a molding system (known but not depicted), such as an injection molding system.

The mold-tool system (100) may include (and is not limited to): a melt-distribution assembly (102). The melt-distribution assembly (102) may include (but is not limited to): a manifold body (104). The manifold body (104) may be manufactured using 3D manufacturing methods or by gun drills, etc. The manifold body (104) may include: (i) an inlet assembly (106), outlets (108) that are spaced from the inlet assembly (106), and (iii) uninterrupted melt channels (110) extending between the inlet assembly (106) and the outlets (108). In one illustrative embodiment, the manifold body (104) has sixteen outlets (108). Each melt channel (110) extends in an uninterrupted manner from the inlet assembly (106) and to a single, associated outlet (108).

An uninterrupted melt channel (110) means that there are no melt-channel intersections between the melt channels (110) so that there is no mixing or flow of a melt (resin) between the melt channels (110); that is, there is no interchannel mixing among different uninterrupted melt channels (110). The uninterrupted melt channels (110) are channels that have no breaks so as to avoid causing a split (or a branching) in the flow of a melt flowing along the melt channels (110). A technical effect of the foregoing is that each of the outlets (108) may have similar heat profiles. In sharp contrast to FIG. 1A, there are no melt channel splits in the manifold body (4) of the mold-tool system (100) shown in FIGS. 2A and 2C. Each of the melt channels (110) is a single continuous melt channel from inlet to outlet for each drop leading into a mold cavity of a mold assembly (known and not depicted). By removing the splits, high stress intersections may be removed or reduced, and the imbalance caused by multiple melt channel splits may also be removed or reduced. Another benefit of not having any split is that the size of the melt channel may be kept relatively smaller, if so desired, because a single large melt channel may not be required to carry the melt to the outlets. Each of the melt channels (110) need only be large enough to carry the melt to a single outlet. By reducing the size of the melt channels (110), the stress may be reduced, and weaker, less expensive, and/or thinner manifold material may be used for the manifold body (104). The known mold-tool system (1) shown in FIG. 1A has relatively poorer thermal homogeneity whereas the mold-tool system (100) shown in FIGS. 2A and 2C has a relatively improved uniform thermal uniformity at the outputs. It is preferred that each of the melt channels (110) is of identical length for balanced melt flow so that the temperature profile at each outlet is similar. Each of the melt channels (110) continues uninterrupted from a dedicated inlet to a dedicated outlet. The inlet assembly (106) is configured to divide a flow of melt into geometrically symmetrical portions equivalent to the number of outlets (108).

FIG. 2B is a schematic representation of thermal profiles (114A, 114B, 114C, 114D) for four of the outlets (108), of the mold-tool system (100) of FIGS. 2A and 2C. In FIG. 2B, the darkened regions indicate areas where the temperature of the melt is higher, whereas the lighter regions indicate areas where the temperature of the melt is lower. The inventors have determined that each of the outlets (108) of the manifold body (104) has a similar temperature profile, thus avoiding a situation where some outlets are substantially hotter or substantially cooler than other outlets. This arrangement advantageously permits improved balanced filling of the mold assembly.

According to one embodiment of the mold-tool system (100), the inlet assembly (106) includes a single inlet (107), and the melt channels (110) connect each of outlets (108) to the single inlet. A heating element (212) may be attached to the manifold body (104). According to another embodiment of the mold-tool system (100), the inlet assembly (106) includes a plurality of inlets (107), and the melt channels (110) extend between the inlets (107) and the outlets (108). Each of the melt channels (110) has an exclusive inlet and an exclusive outlet. Each exclusive inlet and outlet pair is associated with only one melt channel.

Figure 3A:
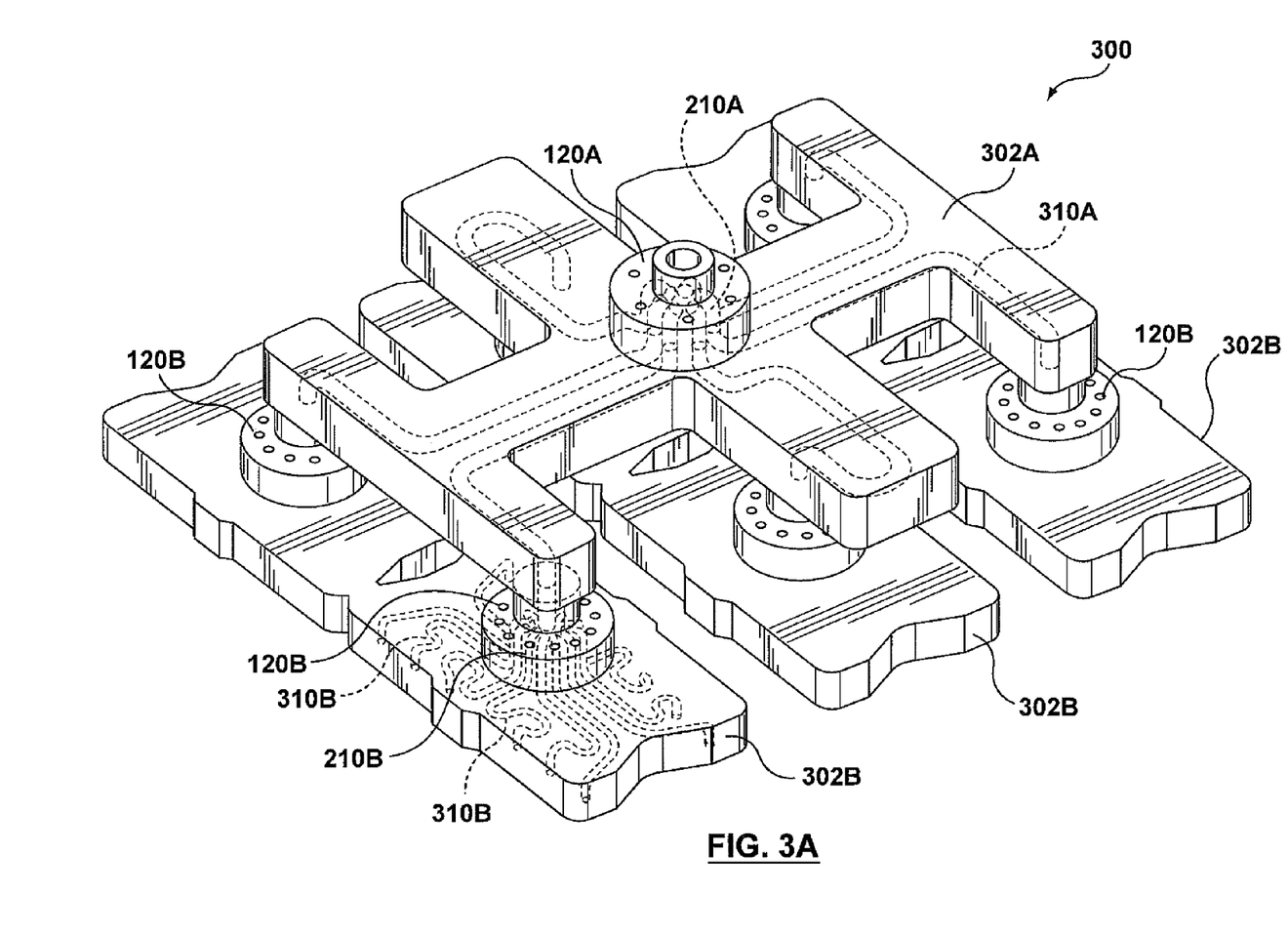
FIG. 3A is a schematic representation of another embodiment of a mold tool system.

FIG. 3A is a perspective view of one embodiment of a mold-tool system (300) which includes a melt-distribution assembly 302A, 302B which is similar to the above-described melt-distribution assembly (102). This particular illustrative embodiment includes an upper melt-distribution assembly (302A) that has uninterrupted melt channels (310A), and a plurality of lower melt-distribution assemblies (302B), each of which has uninterrupted melt channels (310B). FIG. 3D is a top view of the lower melt-distribution assembly (302B) and FIG. 3E is a top view of the upper melt-distribution assembly (302A).

The embodiment illustrated in FIG. 3A also includes a plurality of melt splitting devices (120A, 120B) that includes an upper melt splitting device (120A), and a plurality of lower melt splitting devices (120B). These melt splitting devices (120A, 120B) may each include a single inlet, a plurality of outlets, and a plurality of uninterrupted melt channels (210A, 210B), where each melt channel extend from the inlet to an associated one of the outlets. Further details of the melt splitting devices may be found in co-pending U.S. application Ser. No. 12/913,800, filed Oct. 28, 2010, which is herein incorporated by reference in its entirety.

Figure 3B:
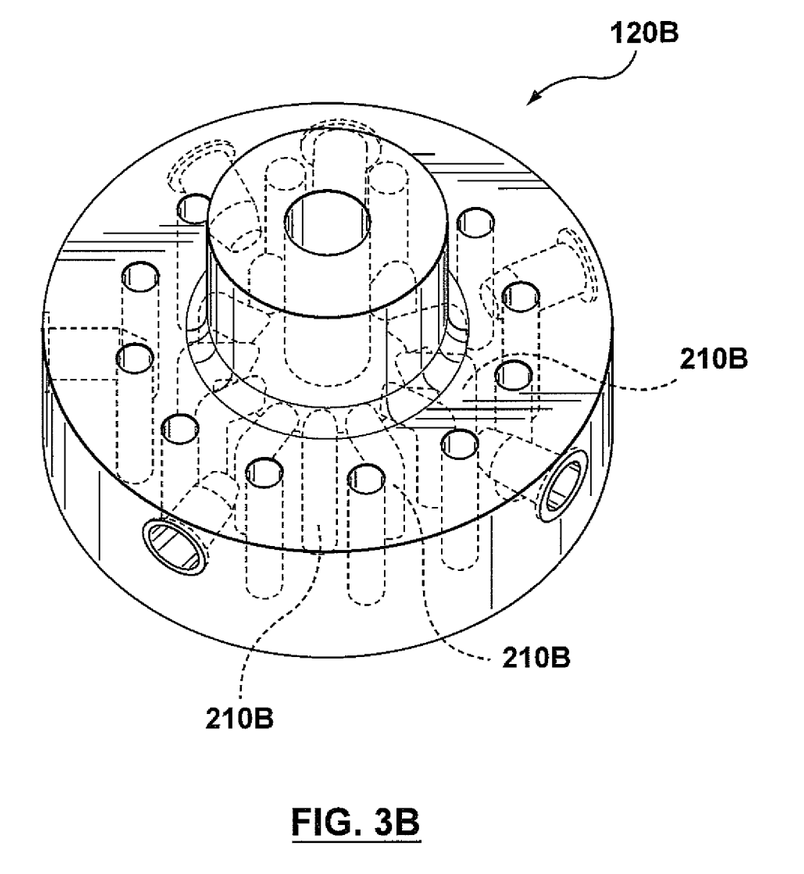
FIG. 3B is a schematic representation of a lower melt splitting device shown in FIG. 3A.
Figure 3C:
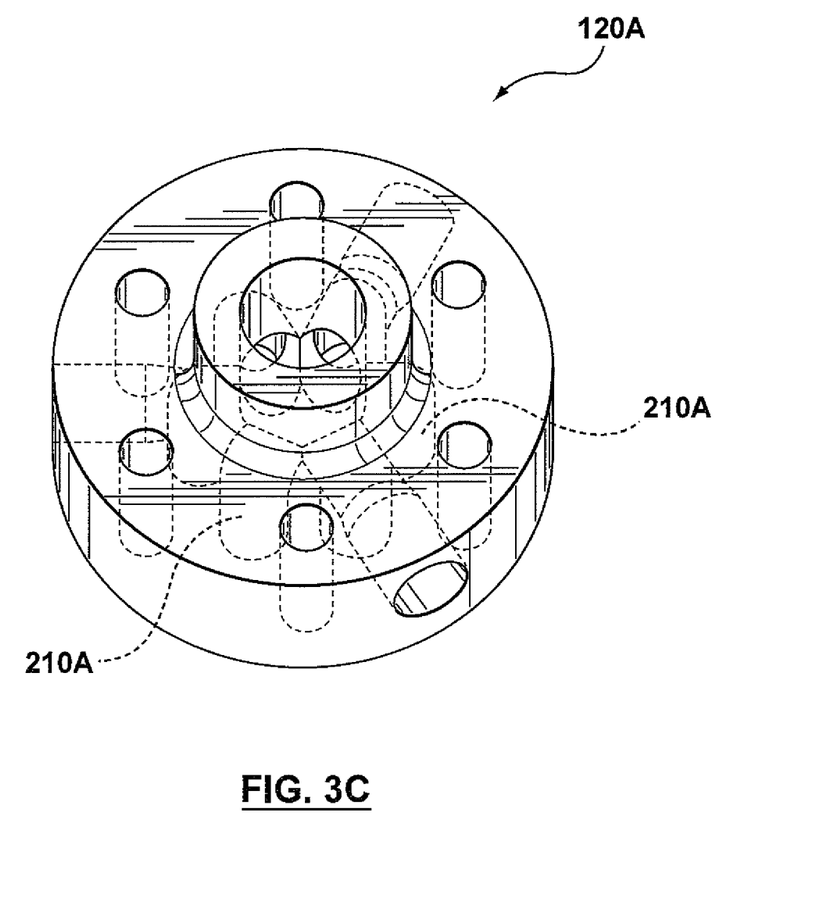
FIG. 3C is a schematic representation of an upper melt splitting device shown in FIG. 3A.
Figure 3D:
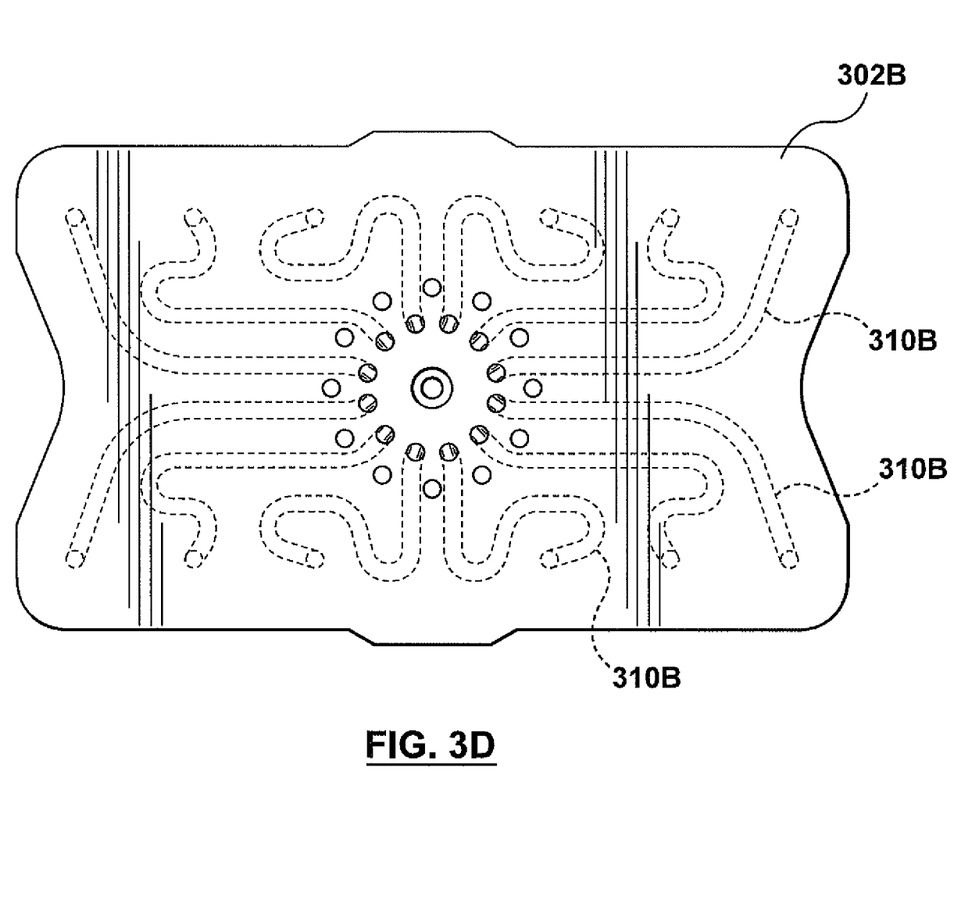
FIG. 3D is a top view of the lower melt-distribution assembly shown in FIG. 3A.
Figure 3E:
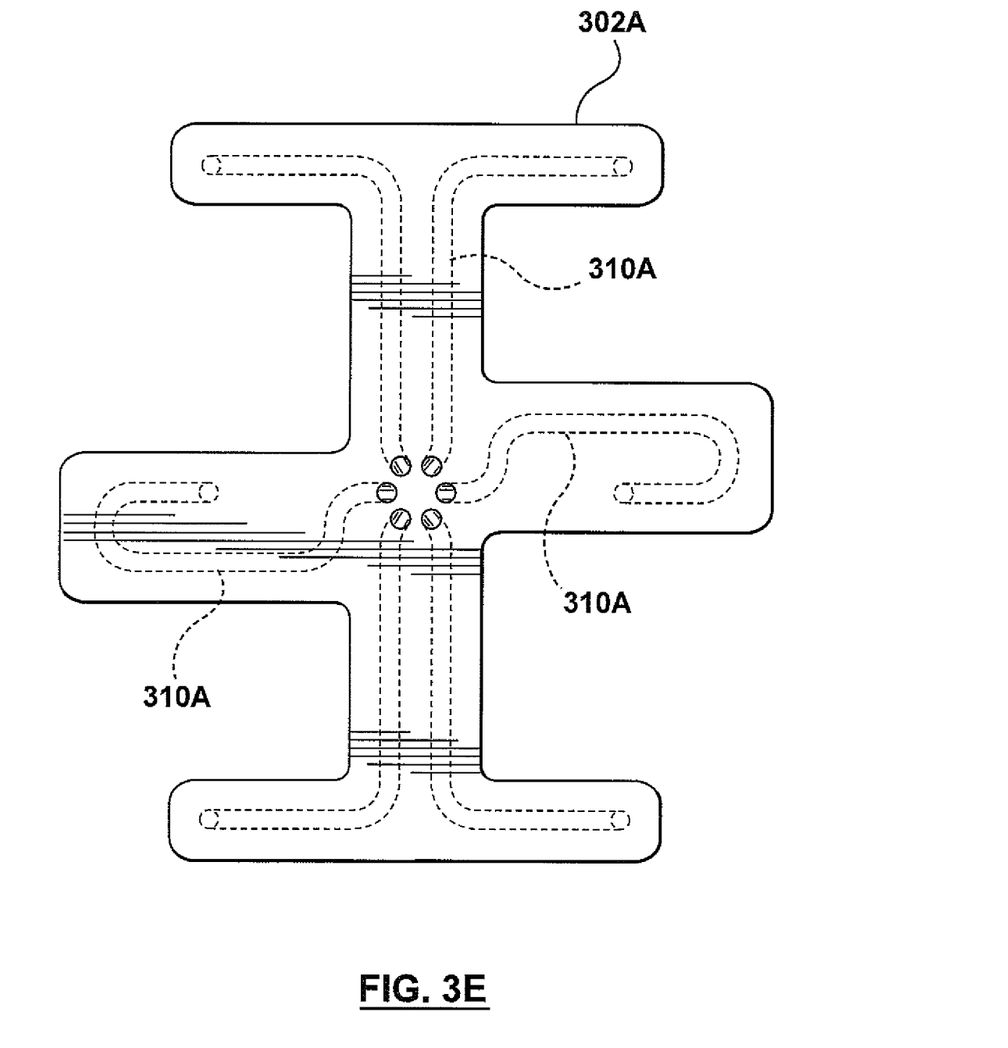
FIG. 3E is a top view of the upper melt-distribution assembly shown in FIG. 3A.

FIG. 3B is a close up perspective view of a lower melt splitting device (120B) and FIG. 3C is a close up perspective view of the upper melt splitting device (120A). As illustrated in FIG. 3A, the upper melting splitting device (120A) is coupled to the upper melt-distribution assembly (302A). The plurality of lower melt splitting devices (120B) are coupled to both the upper melt-distribution assembly (302A) and the plurality of lower melt-distribution assemblies (302B).

It should be appreciated that FIG. 2A illustrates one embodiment of a mold-tool system (100) that is configured for a single manifold arrangement for 16 outputs, while FIG. 3A illustrates another embodiment of a mold-tool system (300) that is configured for a multiple manifold arrangement (that is, a cross manifold to sub manifold arrangement). Each of these embodiments include the above-described uninterrupted melt channels (110, 310).

It is understood that the scope of the present invention is limited to the scope provided by the independent claim(s), and it is also understood that the scope of the present invention is not limited to: (i) the dependent claims, (ii) the detailed description of the non-limiting embodiments, (iii) the summary, (iv) the abstract, and/or (v) description provided outside of this document (that is, outside of the instant application as filed, as prosecuted, and/or as granted). It is understood, for the purposes of this document, the phrase "includes (and is not limited to)" is equivalent to the word "comprising". It is noted that the foregoing has outlined the non-limiting embodiments (examples). The description is made for particular non-limiting embodiments (examples). It is understood that the non-limiting embodiments are merely illustrative as examples.

What is claimed is:

1. A mold-tool system comprising:
    a manifold body comprising:
        a plurality of inlets;
        a plurality of outlets spaced from the plurality of inlets; and
        for each inlet, an associated melt channel that extends uninterrupted between that inlet and a corresponding one of the outlets, wherein that inlet and the corresponding outlet are dedicated to the associated melt channel.

2. The mold-tool system of claim 1, further comprising:
    a melt-distribution assembly, the melt distribution assembly comprising:
        an upper melt-distribution assembly including uninterrupted melt channels;
        a plurality of lower melt-distribution assemblies each including uninterrupted melt channels;
    an upper melt splitting device, and
    a plurality of lower melt splitting devices;
    the upper melt splitting device being coupled to the upper melt-distribution assembly and the plurality of lower melt splitting devices connecting the upper melt-distribution assembly to the plurality of lower melt-distribution assemblies,
    at least one of the upper melt-distribution assembly and the lower melt-distribution assembly including the manifold body.

3. The mold tool system of claim 1, wherein there is no mixing of melt in one of the associated melt channels with melt in another of the associated melt channels.

4. The mold tool system of claim 1, wherein each of the associated melt channels has no split in the flow of a melt flowing along the associated melt channels.

5. The mold tool system of claim 1, wherein the thermal profiles at each outlet are substantially similar.

6. A mold-tool system comprising:
    a manifold body comprising:
        a plurality of inlets;
        a plurality of outlets spaced from the plurality of inlets; and
        a plurality of uninterrupted melt channels extending between the plurality of inlets and the plurality of outlets, each of the uninterrupted melt channels being associated with only one inlet and only one outlet, wherein the plurality of melt channels includes at least a first melt channel having a first length, and a second melt channel having a second length, wherein the first length is substantially identical to the second length.

7. The mold-tool system of claim 6, wherein each of the plurality of melt channels has a substantially uniform length.

8. The mold tool system of claim 6, wherein the thermal profiles at each outlet are substantially similar.

* * * * *